(12) United States Patent
Chastain, Jr.

(10) Patent No.: US 9,073,475 B2
(45) Date of Patent: Jul. 7, 2015

(54) CARGO AND VEHICLE RAMP LOADING SYSTEM

(76) Inventor: Robert M. Chastain, Jr., Hampton, GA (US)

( * ) Notice: Subject to any disclaimer, the term of this patent is extended or adjusted under 35 U.S.C. 154(b) by 539 days.

(21) Appl. No.: 13/464,315

(22) Filed: May 4, 2012

(65) Prior Publication Data

US 2013/0294873 A1    Nov. 7, 2013

(51) Int. Cl.
*B60P 1/43*    (2006.01)
*B65G 69/30*    (2006.01)

(52) U.S. Cl.
CPC .................. *B60P 1/433* (2013.01); *B60P 1/435* (2013.01); *B65G 69/30* (2013.01)

(58) Field of Classification Search
CPC ............ B60P 1/43; B60P 1/435; B65G 69/30
USPC .............................................. 296/61; 414/537
See application file for complete search history.

(56) References Cited

U.S. PATENT DOCUMENTS

| | | | |
|---|---|---|---|
| 4,601,632 A * | 7/1986 | Agee .............................. | 414/537 |
| 5,257,894 A | 11/1993 | Grant | |
| 5,468,114 A | 11/1995 | Hickerson | |
| 5,597,195 A | 1/1997 | Meek | |
| 6,042,923 A * | 3/2000 | Lewis .............................. | 296/61 |
| 6,705,820 B2 | 3/2004 | Schilling | |
| 7,309,202 B1 | 12/2007 | Anderson | |
| 7,488,025 B1 * | 2/2009 | Roberson ........................ | 296/61 |
| 7,524,156 B2 | 4/2009 | Garbes | |
| 7,549,692 B2 | 6/2009 | Washington | |
| 7,810,196 B1 | 10/2010 | Pritchard et al. | |
| 7,976,264 B1 | 7/2011 | Pope | |
| 2004/0009055 A1 | 1/2004 | Scherle | |
| 2004/0146385 A1 | 7/2004 | Edwards et al. | |
| 2004/0219004 A1 | 11/2004 | Huggins | |
| 2004/0223836 A1 | 11/2004 | Robertson | |
| 2006/0245883 A1 | 11/2006 | Fontaine et al. | |
| 2008/0159838 A1 | 7/2008 | Sherer | |
| 2010/0266378 A1 | 10/2010 | Verwys | |
| 2011/0072596 A1 | 3/2011 | Kenny | |

* cited by examiner

*Primary Examiner* — James Keenan
(74) *Attorney, Agent, or Firm* — J.T. Hollin, Attorney at Law, P.C.

(57) ABSTRACT

Disclosed is an adjustable-length, variable-tracked ramp loading system attachable to a stationary loading dock or to the bed of any of a variety of trucks, said ramp loading system functioning to assist with the loading of assorted types of cargo including mowing equipment, wheeled vehicles, construction equipment, supplies, materials, and other objects of dimensions compatible with the size of the ramps which comprise the ramp loading system installed. The system is constructed and operates with a minimum of two (2) extendable ramps, each ramp reinforced with four lengthwise I-beams. Each ramp is manually pulled out from its individual bridge, which bridge itself is stored inside horizontally-oriented primarily longitudinal housing channels attached to the bed of the truck or loading dock. The ramps may be extended and angularly lowered at varying distances from the rear of the truck bed or dock.

6 Claims, 6 Drawing Sheets

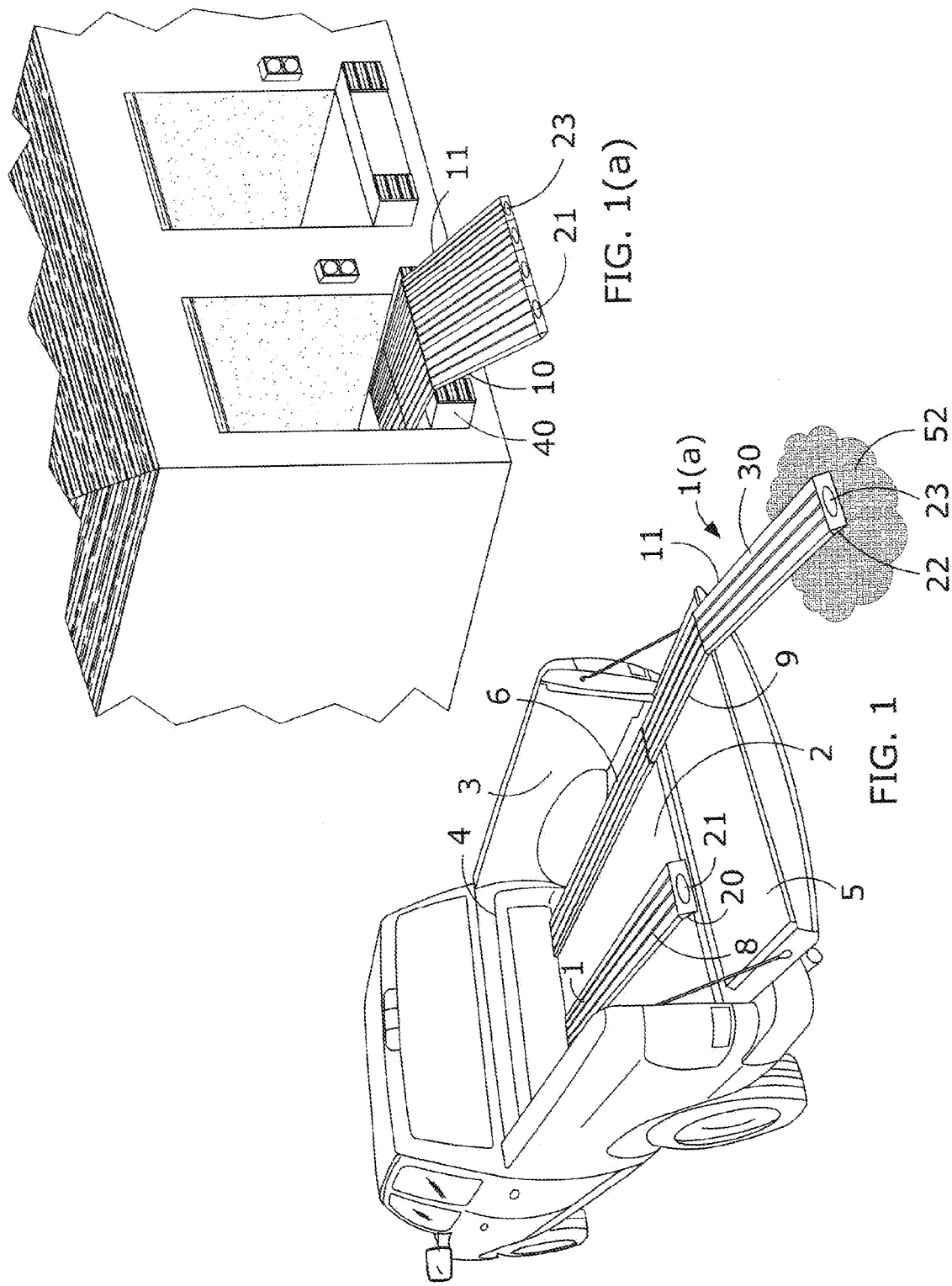

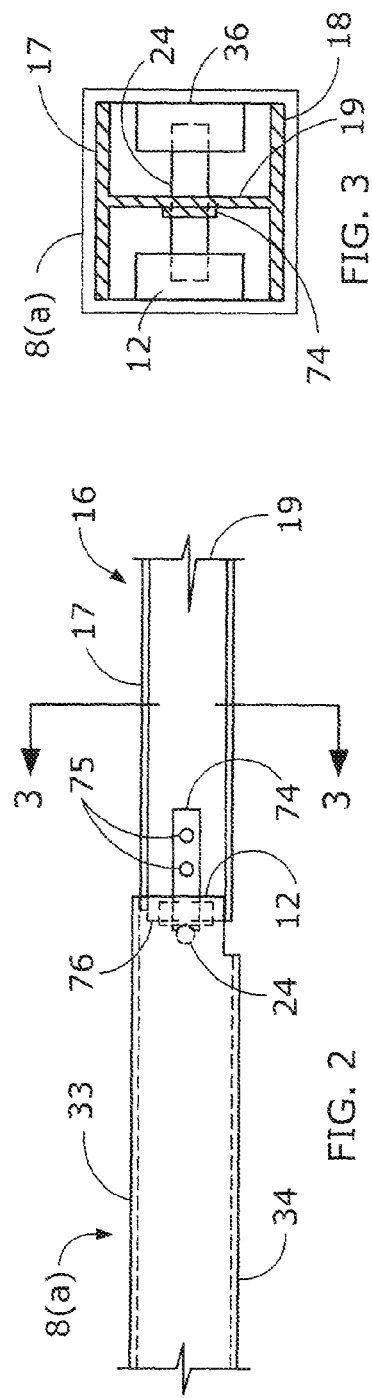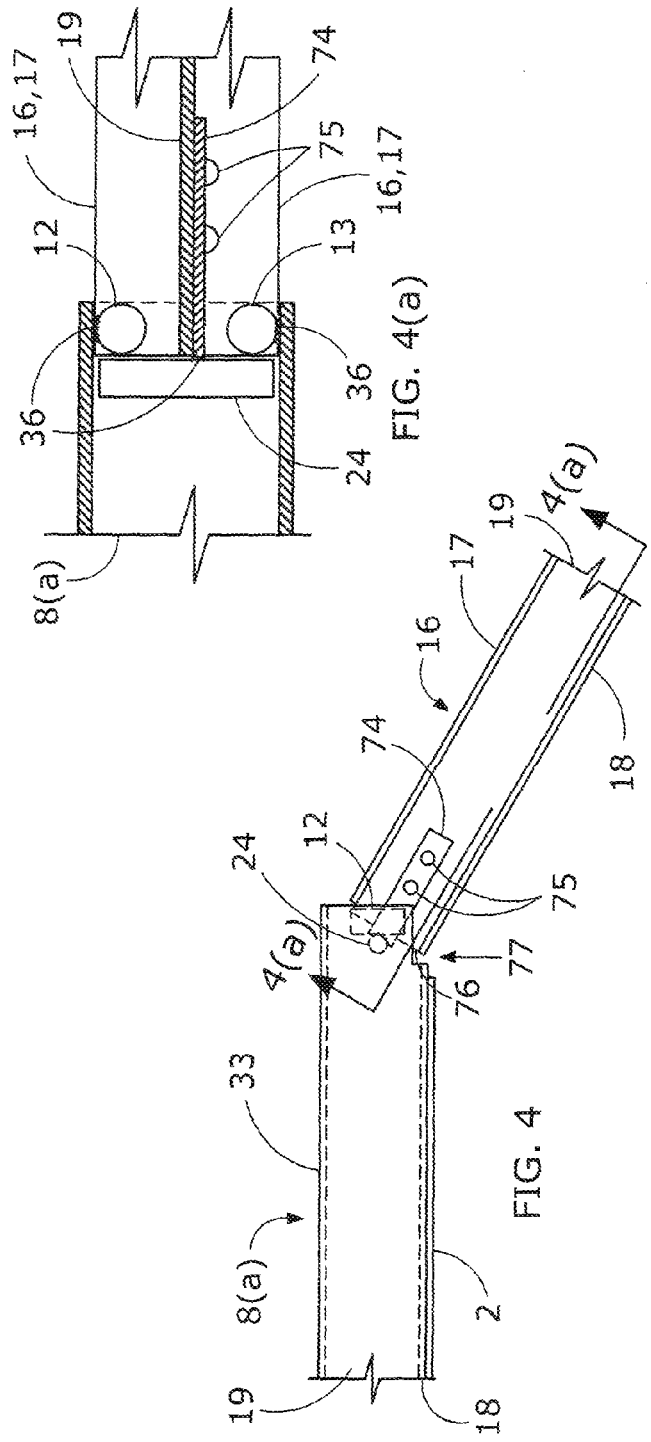

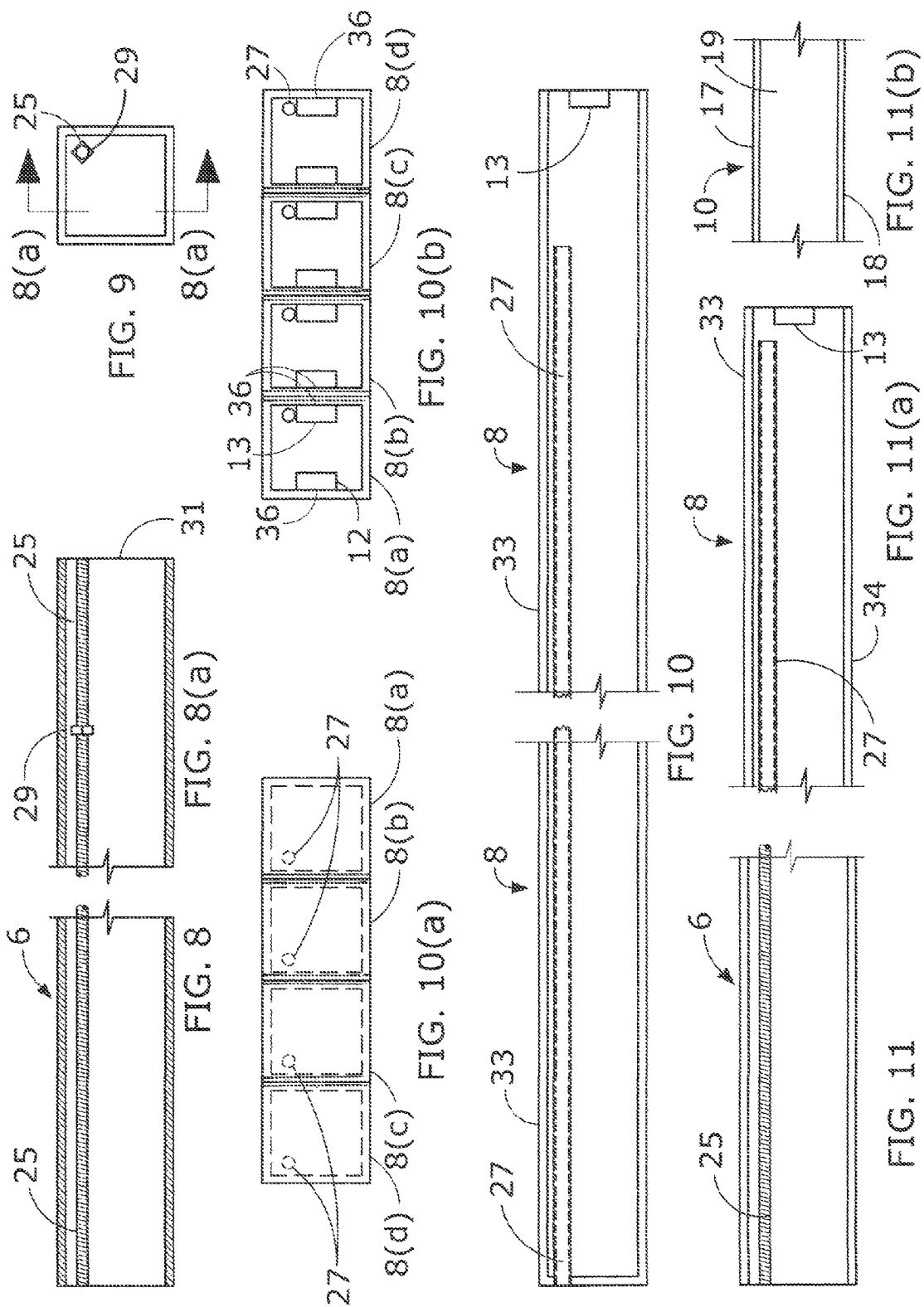

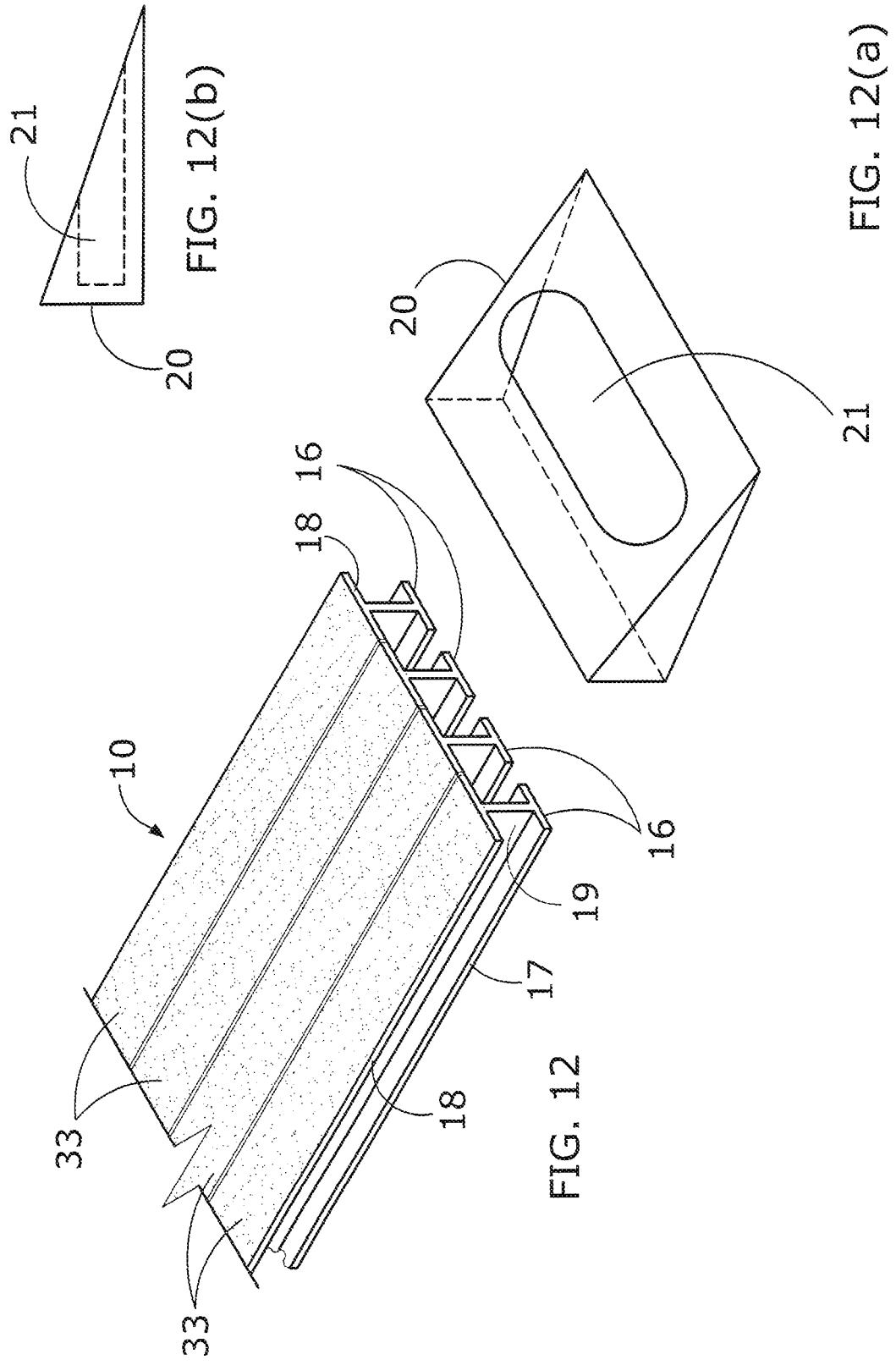

CARGO AND VEHICLE RAMP LOADING SYSTEM

REFERENCE TO RELATED APPLICATION

Not Applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION (1) Field of the Invention

The inventive concepts presented herein generally are concerned with devices and methods for operating an efficient and extendable ramp with sufficient strength and durability to on-load and off load objects such as lawn care equipment, construction equipment, small earth movers, ATV's, and other wheeled vehicles.

Several varying mechanisms and systems have been marketed over the years. Ramps have been designed to be carried within the cargo area of a truck and deployed at the time of loading or unloading cargo. Most of these ramps take up valuable cargo space and usually must be secured with heavy-duty straps or other restraints. This may take considerable time to store and/or deploy such ramps. It is not compact nor is it convenient and easy to extend or assemble quickly.

Some solutions utilize a tailgate with a ramp that is troublesome, overly-large, or difficult to install and operate and usually requires removal of the factory-equipped tailgate. The inventive concept herein provides a safe, inexpensive, strong, simple to operate, extendable ramp system that can be securely installed in a compact space occupying no more than three inches vertically above the truck's bed.

(2) Description of the Related Art

The following documents present general concepts related to the inventive concept herein.

US 2011/0072596 (Mar. 31, 2011) disclosed is a system extending a ramp from a storage position on a vehicle tailgate or flatbed. The device has a collection box channel with a sliding member slidingly engaged and moving within the collection box channel and coupling an end of the ramp to the collection box, the sliding member being coupled to the end of the ramp closest to the collection box when the ramp is extended. Two support hinge members couple the two folding support members, where the two folding support members extend, unfold, and pivot on the two support hinge members and straighten and the extension member extends on the control element to extend the ramp.

U.S. Pat. No. 7,976,264 (Jul. 12, 2011) A truck bed platform apparatus is provided as replacement or original equipment. An access below the platform selectively houses the individually rollingly removable ramps. Bi-directional hinges which fasten each ramp second section to each first section are lockable, giving the ramps infinite incline and decline capabilities. Bi-directional lockable hinges affix each third section to each second section for the same reason. Varied lengths of the hinged legs also provide selective angle and support for each ramp.

US 2010/0266378 (Oct. 21, 2010) The invention is a device that may be mounted on a bed of a pickup truck for smaller vehicles, such as motorcycles, snowmobiles, or all-terrain vehicles to enter from the ground upon a platform of the loading device. The loading device has a ramp that can be pulled outwardly or rearwardly form said device, and a motorcycle can drive up the ramp to the platform. A dolly slide is pulled outwardly from the device, and extends above the tailgate. The ramp then extends downwardly from the dolly slide, so that no weight or load is displaced on the tailgate.

U.S. Pat. No. 7,810,196 B1 (Oct. 12, 2010) The invention as conceived discloses a variable length system attachable to a standard pickup truck that assists with the loading of all-terrain vehicles and similar items. The length of each ramp can vary independently with the other from four feet to a maximum of eight feet. The extension is similar to that of an extension ladder in which one piece slides inside the other. A textile strap with connectors provides further securement of the ramps with the truck body. When not in use, the ramps can be collapsed and stored in minimal space.

U.S. Pat. No. 3,549,6922 (Jun. 23, 2009) A compact ramp and tailgate system for a vehicle tailgate includes a tailgate having an interior hollow cavity for collapsible storage therein of a pair of ramps that are also telescopically extendable therefrom for loading and unloading equipment into and off the bed of the vehicle such as a pickup truck. Each ramp is mounted to a locking hinge that allows the ramps to pivot up to ninety degrees and each ramp composed of at least three ramp members of decreasing size starting from the largest ramp members that are pivotally interconnected to the locking hinges.

U.S. Pat. No. 7,524,1562 (Apr. 28, 2009) Disclosed is a portable ramp and tool container for use in the bed of a pickup truck where the container includes interchangeable retractable and extendable ramps and tool trays which pull out from the container. Portions of the ramps can pivot downward to contact the ground while the tool tray may have a leg attached for support.

US 2008/0159838 (Jul. 3, 2008) The invention is a three-section foldable loading ramp extending a pick-up truck's cargo area to accommodate heavy and lengthy items. The first, or frame section of the loading ramp installs onto the existing tailgate slip hinges in place of the tailgate without tools or modification of the vehicle. Upper and lower ramp sections are pivotally connected to each other and to the frame section in a similar manner. An arm carried by the first frame section pivots down onto the vehicle's hitch for additional support for the ramp. Two legs pivot down from the upper ramp to the ground, providing further support.

U.S. Pat. No. 7,309,202 (Dec. 18, 2007) A system for transporting and storing a portable combination table/ramp device in a truck, including a substantially flat platform supported by a plurality of support members positioned between the platform and the truck bed and defining a plurality of elongated recesses there between. Elongated table top portion and elongated bench seat portions with tailgate-engaging portions connected thereto are received in the recesses.

US 2006/0245883 (Nov. 2, 2006) A ramp assembly for use in a vehicle provides access thereto by users having restricted mobility. The ramp assembly comprises a ramp platform displaceable relative to a mounting structure between a retracted position and a deployed position. A drive mechanism is disposed within the mounting structure and operates to displace the ramp platform between the retracted and the deployed positions.

US 2004/0009055 (Jan. 15, 2004) Shows a tilting ramp is for mounting to a truck, and once so mounted, for loading, unloading and transport of at least one personal recreational vehicle. The ramp is slidable over the bed of the truck. A pivot member is mounted into a receiver tube mounted to the truck. The pivot member extends upwardly into translational engagement with the ramp. The ramp may be translated over both the bed and the pivot member between a transport position forward on the bed and a pivoting position pivotable about the pivot member. In the pivoting position the ramp is pivotable between the horizontal and an inclined position contacting the ground.

U.S. Pat. No. 6,705,820 (Mar. 16, 2004) A carrier/lift adapted to be mounted in a truck bed, and having a carrying platform that pivots and translates in a constrained manner along a pair of tracks to an inclined loading position for safe and convenient loading of the vehicle into the bed of a truck. A platform having a recess for storage of a pair of nestable loading ramps is also disclosed. The platform can be supported above the floor of a truck bed to provide usable storage space in the bed of the truck between the platform (with the nested ramps stowed therein) and the floor of the truck bed.

US 2004/0223836 (Nov. 11, 2004) A vehicle ramp assembly for loading ATVs and like things onto transporting vehicles. The ramp assembly includes a pair of ramps positioned side-by-side. Each of the ramps has an upper end for engagement with a transporting vehicle and a lower end for positioning upon the ground. At least one crosspiece connects the ramps together between the upper and lower ends thereof. The crosspiece is releasably fastened to one of the ramps and is pivotally fastened to the other one of the ramps for compact storage.

US 2004/0219004 (Nov. 4, 2004) A pickup truck tailgate and loading ramp is formed by a main frame dimensioned to be hingedly received by a given pickup bed. Two pairs of hingedly interconnected frames are rigidly secured to the top rail of the tailgate section and form a pair of ramp tracks when in tailgate lowered position. When not in use the track forming frames are disposed rearwardly of the closed tailgate section.

US 2004/0146385 (Jul. 29, 2004) A retractable ramp system for a mobility vehicle. A ramp platform is driven by a reversible motor, associated drive pulley, and drive belt affixed to a ramp carriage assembly. A spring-loaded mechanical release assembly is used to engage the drive pulley to the motor and to disengage the drive pulley from the motor. The ramp may also be deployed manually. A ramp flap provides a transition between ramp platform and a mobility vehicle. Linear bearing blocks attach to pivot arms of the carriage assembly, which are in turn pivotably attached to ramp platform. Linear bearing blocks translate ramp platform along guide shafts during deployment and stowage.

U.S. Pat. No. 5,597,195 (Jan. 28, 1997) This invention is a tailgate comprising a plurality of foldable members configured to nest one with the others in an upright closed position and to extend longitudinally from the rear of the truck when in an extended position. A notched section is positioned at a top side of the plurality of foldable members when in an upright position for accommodating a goose neck trailer.

U.S. Pat. No. 5,468,1995 (Nov. 21, 1995) Disclosed is a loading device to be fixedly secured to the bed of a pick-up truck for loading and unloading vehicles into and from the bed thereof. Included is a pair of transversely spaced parallel slideways within a rectangular metal frame and a pair of pivotally connected, in tandem, rigid ramp sections. The forward one of said ramp sections being slidably mounted within said slideways and the more rearward one being swingable to a vertical position and connectable thereat to the conventional latching mechanism at the rear end of the side walls of a pick-up truck.

U.S. Pat. No. 5,257,894 (Nov. 2, 1993) Disclosed is a stowable loading ramp assembly for small vehicles, such as pickup trucks, vans and trailer, which includes a stowing chamber and an extendable loading ramp. The assembly is installable in a truck bed, or the like, with the stowed loading ramp access positioned toward the rear or tail gate of the vehicle. The loading ramp is locked in the stowed position by a floating locking plate, which is raised to permit the loading ramp to be withdrawn from the stowing chamber.

BRIEF SUMMARY OF THE INVENTIVE CONCEPT

The inventive concept herein discloses a ramp loading system which, in the preferred embodiment, may be permanently attached to the bed of a pickup truck, trailer truck, or other utility type truck. The disclosures herein essentially comprise a ramp strengthened by I-beams, the ramp being telescopically stored within a compatible bridge, which in turn, is enclosed within a corresponding housing component. The preferred embodiment of the ramp loading system comprises an arrangement of two parallel ramps, each with its own associated bridge and housing. Essentially, each ramp loading system is comprised of three components; a housing, a bridge, and a ramp.

The largest of the three components is the housing, which essentially is an oblong orthogonal cross-section tube, having four hollow, channels within the interior. In the preferred embodiment, each channel comprises a square cross-section its entire length, further having a travel rod attached to the interior of each channel. The housing may be of a length equal to that of the truck bed in which is installed. However, the length of the housing is such as to allow the complete closure of the tailgate of the truck, if so equipped. The ramp loading system may also be installed on a loading dock, wharf, or other permanent structure.

The second component of the system is the bridge, which consists of four hollow, orthogonally cross-sectioned shafts, or sub-bridges, each generally three to four feet in length, having welded guide tubes within. The sub-bridges are functionally arranged side-by-side, longitudinally, and are of an exterior profile of height and width dimensions slightly smaller than that of the interior profiles of the channels of the housing. This provides for the combined slidable enclosure of the sub-bridges within the inner dimensions of the channels of the housing component. The bridge is constructed so as to be stored within the front section of its associated housing, and is restricted from complete separation from the housing.

The third component is the ramp, comprised of four parallel I-beams, each having a front end and a hinge end. The cross-sectional profile of each I-beam is of a width and height dimension less than the inner cross-sectional profile of the sub-bridges. The I-beams are welded together at their front ends, to a common handle, taking care, however, to leave a specific, continuous space along the length of the I-beam flanges. The space between the flanges allows passage of the four I-beams of the ramp through the sub-bridges. When the ramp is completely stored, or "nestled," the bridge and the ramp are mutually enclosed within the housing.

Sequential deployment of the ramp loading system begins, by way of illustration of a pickup truck installation, with (1) opening of the tailgate of the truck, (2) grasping the exposed handle at the front end of at least one ramp, (3) pulling the ramp horizontally outward (which simultaneously places the sub-bridges in sliding motion within the housing); (4) continuing the outward pull of the ramp and bridge until the bridge is fully extended at a travel limit set by bridge stop nuts within the housing channels; (5) physically sensing that the ramp hinge pins engage stop blocks at the front interior of the bridge, thereby limiting further travel of the ramp; and (6) lowering the handle of the ramp until it contacts the ground or other surface.

The ramp loading system disclosed can be included with a vehicle as a standard manufacturer's option, or the vehicle may be retrofitted with the ramp loading system as an accessory. The surfaces of the ramp are coated, with an anti-slip textured finish to ensure safety when walking upon the ramp during rainy or wet conditions. The ramp loading system minimizes strenuous lifting, improves safety, saves space on a truck bed or dock, and is simple to operate.

BRIEF DESCRIPTION OF THE VIEWS OF THE DRAWINGS

The objects, features, and advantages of the concept presented in this application are more readily understood when referring to the accompanying drawings. The drawings show the basic functions of the various components of the ramp loading system. In the several figures, like reference numbers are used in each figure to correspond to the same component as may be depicted in other figures.

FIG. 1 shows a typical pickup truck bed, having two identical ramp loading systems, one open and deployed, while the other is stored on the bed of the truck.

FIG. 2 depicts the side view of a sub-bridge with its corresponding ramp I-beam extended fully horizontal, and with the ramp hinge pivot pin abutting one of two ramp stop blocks.

FIG. 3 presents the front end view of a sub-bridge, shown encompassing an I-beam, as seen from section line 3-3 of FIG. 2.

FIG. 4 is the side view of a sub-bridge with its I-beam extended and rotated downward in preparation for loading or unloading cargo.

FIG. 4(a) presents a bottom-upwards view of the hinge pin of the I-beam shown in FIG. 4, therein abutting two ramp stop blocks of its corresponding sub-bridge.

FIG. 8 is a segmented, cutaway view of the rearmost portion of one channel of the housing component and the travel rod, the view being generated in the direction of the 8(a)-8(a) section line of FIG. 9.

FIG. 8(a) is a segmented, cutaway view of the forward portion of a housing channel, looking in the direction of section line 8(a)-8(a), further illustrating the bridge stop nut fastened to the travel rod.

FIG. 9 is a front view of an empty housing channel of the ramp system, further showing the bridge stop nut and the travel rod.

FIG. 10 presents a cutaway, segmented longitudinal view of a sub-bridge, further showing the guide tube and the left stop block welded to the wall of the front portion of the sub-bridge.

FIG. 10(a) is a rear view of a bridge, comprised by its four sub-bridges, further showing the closed rear end of a rod guide tube for each sub-bridge.

FIG. 10(b) presents a front view of the bridge depicted in FIG. 10(a), showing the left and right stop blocks and the open entry of the guide tubes.

FIGS. 11, 11(a), and 11(b) present a segmented, sequential view of a housing channel, a sub-bridge, and a partial section of the corresponding I-beam of a ramp respectively showing relative sizes of the three components.

FIG. 12 depicts the front end of a ramp, particularly-showing the manner in which the four I-beams are arranged longitudinally.

FIG. 12(a) shows a separated pull-out handle and the handle recess, just prior to attachment of the handle to the I-beams of FIG. 12.

FIG. 12(b) shows a side view of the pull-out handle.

DETAILED DESCRIPTION OF THE INVENTIVE CONCEPT

Figure 5:
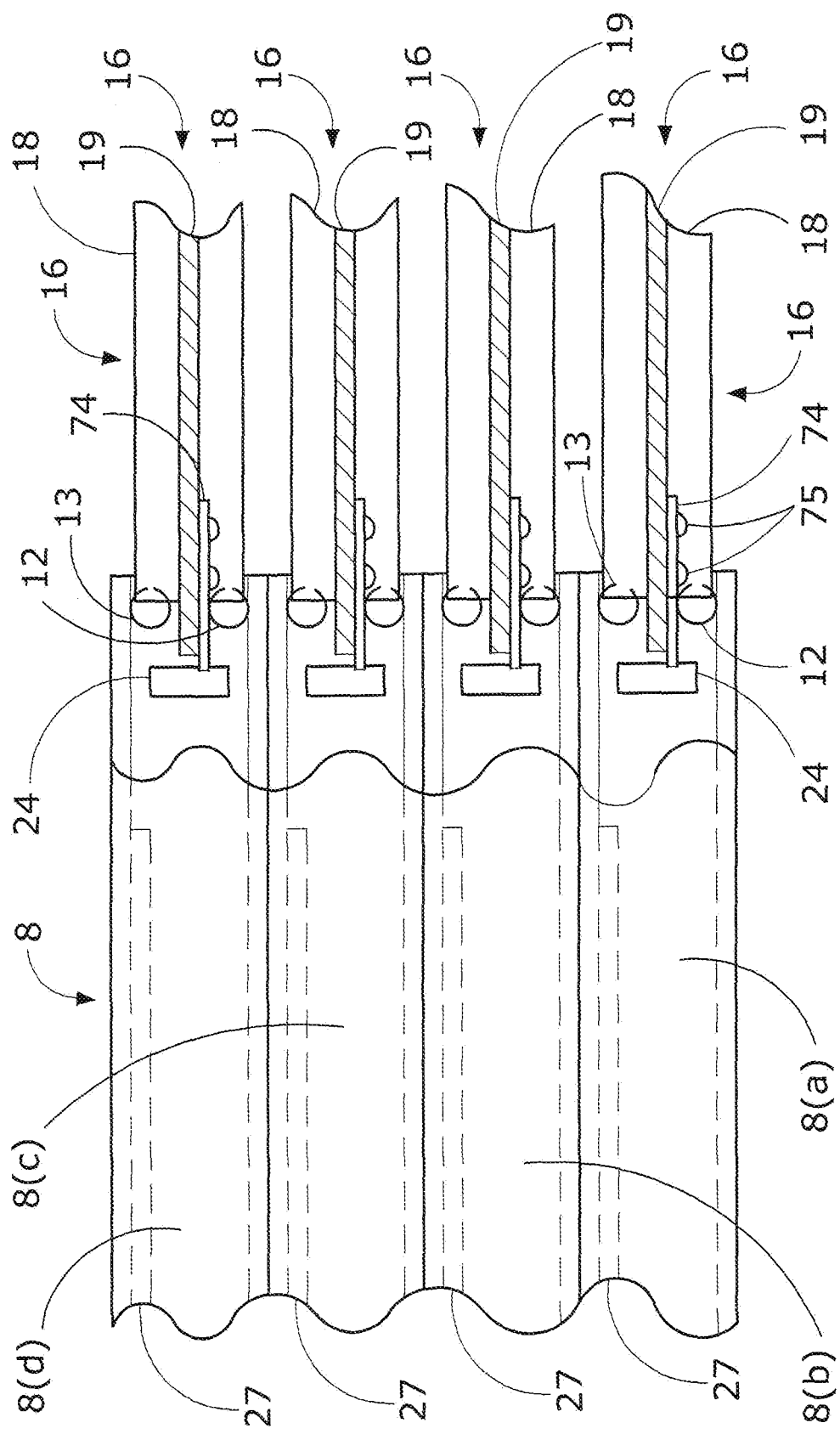
FIG. 5 illustrates a "peel-away" top view of a bridge, comprised of its four sub-bridges with their left and right stop blocks and the associated four I-beams within the sub-bridges.

Beginning with FIG. 1, there is shown the rear of a typical pickup truck 4 with two ramp systems 1, 1(a) installed in its bed 2. The first ramp loading system 1 is fully stored on the bed of the truck 4. A second ramp system 1(a) is fully deployed, with its ramp 11 lowered to its contact point with the surface 52. A portion of the deployed ramp 11 previously had been stored within its associated bridge 9, and the bridge 9, in turn had been fully encompassed within the forward portion of the housing 6. To accomplish the deployment of the first ramp 1(a) the user had to grasp the handle 22 by its recessed opening 23 and pull horizontally outward. This outward action continued until the full length of the ramp 11 had deployed, at which time the ramp 11 is extended its full length and a mechanical stop 12, 13 (not shown) caused the bridge 9 to begin its extension from the associated housing 6.

Upon the bridge 9 reaching its full extension, a bridge stop nut 29 (not shown) affixed to the interior of the housing 6, prevented further extraction of the bridge 9. Once the bridge 9 has been extended its full length, the bridge 9 extends across the width of the tailgate 5 of the truck 4 and serves to prevent damage to the tailgate 5. Likewise, by grasping the recessed handle 21 of the remaining first ramp 10, (not shown, but stored within the bridge 8 and its associated housing) the first ramp 10 may also be extended. The currently shown deployed ramp 11 is fabricated with a non-slip coating 30 for footing safety, as is the bridge 9 and housing 6.

The previously-described ramp 11, in its entirety, is an assemblage of four I-beams 16 (refer to FIG. 12) fixedly welded together at the junction of the front end of the four I-beams 16 and the rear flat surface of the second handle 22. In referring to FIG. 12, there is shown an abbreviated end view of a typical ramp 10 with four custom-fitted I-beams 16, assembled with their flanges 17 parallel to each other. The I-beams 16 and the attached handles 21, 22 comprise the entire length of the ramp 10. Shown apart from the ramp 10 in FIG. 12 is the handle 20 which, during fabrication, is welded to the front ends of the I-beams 16. A user grasps the handle by the recessed opening 21 in order to initiate withdrawal of the associated ramp 10.

In moving to FIG. 2, a close-up view of the mechanism associated with the deployment of the second ramp 10 from its corresponding bridge 8 is shown. For the sake of simplicity, only one I-beam 16 of the second ramp 10 is shown as it is fully extended horizontally from its associated sub-bridge 8(a) in FIG. 2 and FIG. 3. Additionally, the upper flange 17, web 19, and lower flange 18 of the single I-beam 16 are shown. For a complete ramp, three additional I-beams 16 are included, parallel to each other on the other side of the single I-beam 16 shown.

Also shown in FIG. 2 is a bracket 74 attached to the web 19 of the I-beam 16 by two bolts 75. The bracket 74 extends to the I-beam end, where a hinge pivot pin 24 is orthogonally welded to the end of the bracket 74. The two bolts 75 may be loosened and thereby allow the slidable positioning of the bracket 74 along the horizontal slot 76. The variable positioning feature of the bracket 74 permits the deployment of the ramp 10 at a variety of downward angles for cargo loading and further helps the ramp in clearing the tailgate 5 of a truck, if present. In FIG. 3, a cross-sectional view of a sub-bridge 8(a) is shown, including its the upper flange 17, web 19, lower flange 18, and the hinge pivot pin 24 of the single I-beam 16. FIG. 3 is presented from the perspective of section line 3-3 of FIG. 2. Also shown in FIG. 3 is the bridge front end and the left and right stop blocks 12, 13 which are welded 36 to the front interior wall of sub-bridge 8(a).

In viewing FIG. 4, there is shown the single I-beam 16 of FIG. 3 fully extended and positioned at a downward angle suitable for loading cargo. The single I-beam 16 has come to the limit of its travel from the interior of the sub-bridge 8(a). This travel limit is controlled by the hinge pin 24 of the I-beam 16 coming in direct contact with the left stop block 12, and the right stop block 13 (not shown) said stop blocks being welded to the front interior wall of the sub-bridge 8. The ramp hinge end 76 and the hinge pin 24, thereby allow the I-beam 16 to rotate through a certain radius sufficient to come in contact with the surface 52. The functions described by the single I-beam 16 and sub-bridge 8(a) are illustrative of an entire ramp 10 containing the full complement of four I-beams 16 and four sub-bridges.

FIG. 5 depicts a "peel-away" top view of a bridge 8 component of the ramp loading system 1, 1(a). Shown in FIG. 5 are the four sub bridges 8(a), 8(b), 8(c), and 8(d). Also shown are rod guide tubes 27, which are welded onto the walls of each sub-bridge 8(a), 8(b), 8(c), 8(d). The rod guide tubes 27 are fabricated to envelop a portion of the length of a housing 6 threaded travel rod 25 upon closing of either ramp system 1, 1(a) and retraction of the sub-bridges 8(a)-8(d) into the interior of the channels of the housing 6. A clearer presentation of the travel rod 25 and its position within a channel of the housing 6 is depicted in FIG. 8, FIG. 8(a), and FIG. 9.

The presentation in FIG. 5 further displays the four I-beams 16 comprising ramp 10 approaching full extension from the interior sub-bridges 8(a), 8(b), 8(c), 8(d). Each respective hinge pivot pin 24 is nearing contact with the left and right stop blocks 12, 13 welded to each of the sub-bridges 8(a), 8(b), 8(c), 8(d). Upon the hinge pivot pins 24 making such stop block 12, 13 contacts, the ramp 10 will then be in position for lowering toward the work surface 52.

Figure 7:
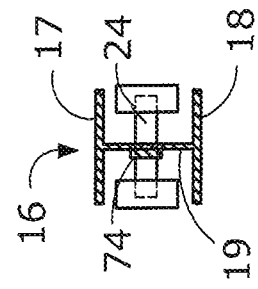
FIG. 7 is a view looking longitudinally from the hinge end, and along the axis of the I-beam of FIG. 6
Figure 6:
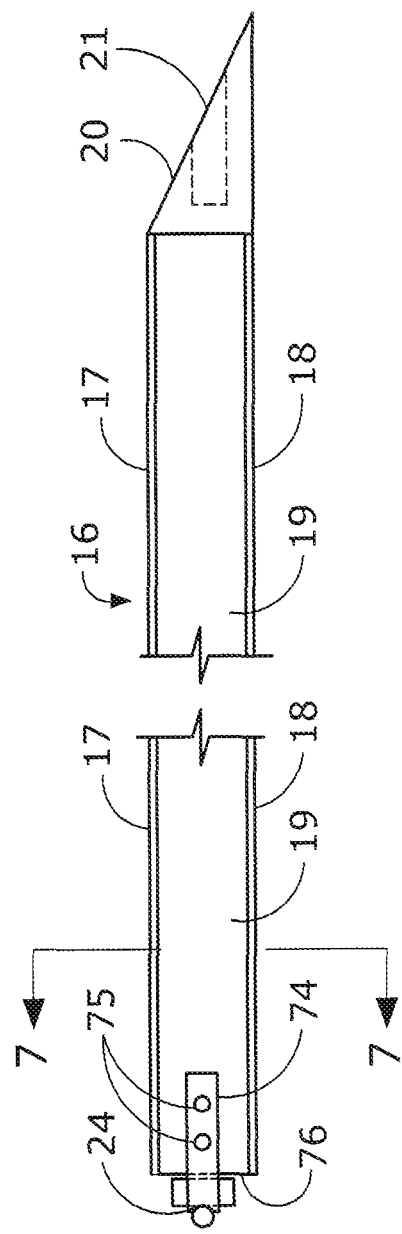
FIG. 6 shows a segmented lengthwise view of a typical I-beam, including the hinge end, hinge pin, and the handle at the front end of the I-beam.

Moving to FIG. 6, there is illustrated a segmented side view of the left-most I-beam 16 of a ramp. Shown therein is the ramp hinge end 76, the hinge pivot pin 24, I-beam bracket 74, upper and lower flanges 17, 18, the I-beam web 19, and the attached pull-out handle 20. FIG. 7 presents an end view of the I-beam 16 of FIG. 6.

In FIG. 8, there is shown a segmented, cutaway view of one channel of the housing 6 component of the ramp loading system 1, 1(a), the view being generated in the direction of the 8(a)-8(a) section line of FIG. 9. A threaded travel rod 25, which is attached to an inner wall of each of the channels of the housing 6 is also shown. In FIG. 8(a) there is displayed a bridge stop nut 29 which is rotatingly engaging the outer circumference of the travel rod 25 during normal operations. The engagement by the bridge stop nut 29 thereby prevents extension of the bridge 8 beyond the ramp 6 housing opening 31. This occurs by virtue of the closed end of a sub-bridge guide tube 27 (shown in FIG. 10) in each sub-bridge 8(a)-8(d) coming in direct contact with the bridge stop nut 29

FIG. 9 is an end view of one channel of the ramp 6 housing opening 31. The bridge stop nut 29 is shown as threaded onto the travel rod 25.

FIG. 10 presents a cutaway longitudinal view of a sub-bridge 8. In this perspective, the rod guide tube 27 of sub-bridge 8(a) is displayed, along with the left stop block 12. The left stop block 12 is attached to the wall of the front portion of the sub-bridge 8(a) by a weld 36. FIG. 10(a) displays a rear view of the entire bridge 8, further depicting the hidden views of the four sub-bridges 8(a), 8(b), 8(c), and 8(d) and the closed ends of the four rod guide tubes 27.

FIG. 10(b) presents a front view of the sub-bridges 8(a), 8(b), 8(c), and 8(d), further showing the left and right stop blocks 12, 13 and the open end of the rod guide tubes 27.

FIGS. 11, 11(a), and 11(b) present segmented, sequential views of a housing 6, bridge 8, and a partial section of a ramp 10, respectively. The left-to-right ordering in these three figures depict a rear-to-front arrangement of a ramp system. FIG. 11(b) displays the side view of the flanges 17, 18 and web 19 of an outer I-beam which, along with three other parallel I-beams would comprise a complete ramp 10. The individual I-beam of FIG. 11(b) functions within sub-bridge 8(d) of FIG. 10(b). These three views respectively depict relative sizes and the telescopic manner of nestling with sufficient lateral and longitudinal clearance, of these components, from left to right. A desired closing of the ramp 10 would proceed from right to left, terminating in storage of the ramp 10 within the housing 6.

FIG. 12 illustrates the longitudinal proximity of four typical I-beams 16 as they are aligned and spaced between their respective flanges 17, 18, so as to permit ease of horizontal travel of the I-beams 16 in and out of the slightly larger sub-bridges 8(a), 8(b), 8(c), and 8(d). The front ends of the I-beams 16 are aligned flush so as to facilitate the welding of the displayed handle 21 in FIG. 12(a) onto the I-beam 16 front ends. FIG. 12(b) depicts the internal space available in the recess 21 of the handle 20 so as to allow grasping and pulling of a ramp. The assemblage of the four I-beams 16 comprises a single ramp 10, and are further with a textured, non-slip coating 33 on the top exterior surfaces of the I-beams 16.

While preferred embodiments of the present inventive concept have been shown and disclosed herein, it will be obvious to those persons skilled in the art that such embodiments are presented by way of example only and not as a limitation to the scope of the inventive concept. Numerous variations, changes, and substitutions may occur or be suggested to those skilled in the art without departing from the intent, scope, and totality of the inventive concept. Such variations, changes, and substitutions may involve other features which are already known per se and which may be used instead of, or in addition to features already disclosed herein. Accordingly, it is intended that this inventive concept not be limited by the scope of the accompanying claims.

What is claimed is:

1. A ramp loading system for loading and unloading cargo, wheeled vehicles, and various types of equipment onto or from the bed of a pickup truck or the floor of a utility truck, the system comprising a ramp loading apparatus of interconnected components comprising at least one housing, a bridge, and a ramp, wherein:

the housing further comprises four parallel channels of hollow, four-sided orthogonal cross-section with a length-wise travel rod welded within each channel for retention of a stop nut on said travel rod and said housing being permanently affixed to the bed or floor of said truck;

the bridge comprises four parallel primarily longitudinal sub-bridges of hollow, four-sided orthogonal cross-section, having interior walls, a back end, and a front end, further having vertically-oriented cylindrical left and right stop blocks welded to the interior walls of each sub-bridge proximate the front end of said sub-bridge, and a guide tube welded lengthwise along one wall of each sub-bridge, and further, all sub-bridges having collectively, an exterior profile corresponding to the dimensions and profile of the respective interiors of said channels of said housing;

the ramp comprises four parallel I-beams each I-beam contained within one of the four sub-bridges, each I-beam comprising a front end and a hinge end, said hinge end containing a bracket bolted thereto, whereby said bracket is further welded to a hinge pin, which hinge pin provides restraint of the I-beam against the left and right stop blocks of its respective sub-bridge, and further, said four parallel I-beams being welded together at their front ends to a common handle, leaving clearance along the length of said flanges of said I-beams, to allow travel of each I-beam within its respective sub-bridge; whereupon said ramp loading system, in a stored configuration, telescopically retains said bridge within the confines of said housing and retains a forward portion of said ramp within said bridge, whereupon operational deployment, said bridge and the full length of said ramp are sequentially withdrawn from said housing and said ramp is thereupon rotated, proximate said hinge pin, in a downward arc to contact the ground or other surface for loading or unloading cargo.

2. A device as in claim 1, further comprising (a) a plurality of said ramp loading systems, arranged horizontally and mutually parallel lengthwise, and (b) a rough-textured, non-slip coating on the top exterior surfaces of the ramp, the bridge, and the housing.

3. A ramp loading system for loading and unloading cargo, wheeled vehicles, and various types of equipment onto or from a dock, or wharf, or other permanent structure, the system comprising a ramp loading apparatus of interconnected components comprising at least one housing, a bridge, and a ramp, wherein:

the housing further comprises four parallel channels of hollow, four-sided orthogonal cross-section with a length-wise travel rod welded within each channel for retention of a stop nut on said travel rod and said housing being installed on the dock, wharf, or other permanent structure;

the bridge comprises four parallel primarily longitudinal sub-bridges of hollow, four-sided, orthogonal cross-section, having interior walls, a back end, and a front end, further having left and right vertically-oriented cylindrical stop blocks welded to the interior walls of each sub-bridge proximate the front end of said sub-bridge, and a guide tube welded lengthwise along one wall of each sub-bridge, and further, all sub-bridges having collectively, an exterior profile corresponding to the dimensions and profile of the respective interiors of said channels of said housing;

the ramp comprises four parallel I-beams, each I-beam contained within one of the four sub-bridges, each I-beam comprising a front end and a hinge end, said hinge end containing a bracket bolted thereto, whereby said bracket is further welded to a hinge pin, which hinge pin provides restraint of the I-beam against the left and right stop blocks of its respective sub-bridge, and further, said four parallel I-beams being welded together at their front ends to a common handle, leaving clearance along the length of said flanges of said I-beams, to allow travel of each I-beam within its respective sub-bridge; whereupon said ramp loading system, in a stored configuration, telescopically retains said bridge within the confines of said housing and retains a forward portion of said ramp within said bridge, whereupon operational deployment, said bridge and the full length of said ramp are sequentially withdrawn from said housing and said ramp is thereupon rotated, proximate said hinge pin, in a downward arc to contact the ground or other surface for loading or unloading cargo.

4. A device as in claim 3, further comprising (a) a plurality of said ramp loading systems, arranged horizontally and mutually parallel lengthwise, and (b) a rough-textured, non-slip coating on the top exterior surfaces of the ramp, the bridge, and the housing.

5. A ramp loading system for loading and unloading cargo, wheeled vehicles, and various types of equipment onto the bed of a pickup truck or the floor of a utility truck, the system comprising a ramp loading apparatus of interconnected components comprising:

a housing, comprising primarily oblong, parallel channels each having a square, hollow cross section, a closed back end, and an open front end, further having a circular, threaded travel rod attached to the back end, and parallel to the length, of each said channel, and having a stop nut threaded at a position proximate the front end of said travel rod;

a bridge, comprising four square cross-sectioned, hollow sub-bridges, each generally three to four feet in length, further having interior walls, a back end, and a front end, further having left and right cylindrical stop blocks welded to the interior walls of said sub-bridges, proximate the front end of said sub-bridge, a guide tube having one open end welded lengthwise to one upper longitudinal corner of each said sub-bridge, with said sub-bridges functionally arranged side-by-side, longitudinally, and further, all sub-bridges collectively having an exterior profile of height and width dimensions slightly smaller than that of the interior profile of said housing channels, such that allowance is made for the combined close-fitting enclosure of said sub-bridges within the inner dimensions of said housing channels;

a ramp comprised of four parallel I-beams, each I-beam contained within one of the four sub-bridges, each having a front end and a hinge end, said hinge end containing a bracket bolted thereto, whereby said bracket is further welded to a hinge pin, which hinge pin provides restraint of the I-beam against the left and right stop blocks of its respective sub-bridge, wherein the combined front ends of said I-beams are welded together to a common handle, with the creation of a lengthwise spacing between adjacent I-beam flanges, and further, the cross-sectional profile of each I-beam being of a width and height dimension less than the inner cross-sectional profile of each of said sub-bridges, such that the I-beams may individually pass through each corresponding sub-bridge; and whereupon, said ramp loading system, when not in use, may be completely stored, the ramp being retractedly enclosed within the bridge and the bridge being retractedly enclosed within the housing, and upon initiating functional operation, said ramp and bridge are sequentially withdrawn from said housing and said ramp is thereupon rotated proximate said hinge pin, in a downward arc to contact the ground or other surface for loading or unloading cargo.

6. A device as in claim 5, further comprising (a) a plurality of said ramp loading systems, arranged horizontally and mutually parallel lengthwise, and (b) a rough-textured, non-slip coating on the top exterior surfaces of the ramp, the bridge, and the housing.

\* \* \* \* \*